(12) United States Patent
Saito et al.

(10) Patent No.: US 9,077,938 B2
(45) Date of Patent: Jul. 7, 2015

(54) ELECTROSTATIGRAPHIC IMAGE FORMING APPARATUS WITH DROPLET EJECTING UNIT

(71) Applicants: Hiroyuki Saito, Tokyo (JP); Hiroshi Akita, Musashino (JP); Eri Yagi, Yokohama (JP); Tomohiro Kawasaki, Sagamihara (JP)

(72) Inventors: Hiroyuki Saito, Tokyo (JP); Hiroshi Akita, Musashino (JP); Eri Yagi, Yokohama (JP); Tomohiro Kawasaki, Sagamihara (JP)

(73) Assignee: KONICA MINOLTA, INC. (JP)

( * ) Notice: Subject to any disclaimer, the term of this patent is extended or adjusted under 35 U.S.C. 154(b) by 184 days.

(21) Appl. No.: 13/690,729

(22) Filed: Nov. 30, 2012

(65) Prior Publication Data

US 2013/0141741 A1 Jun. 6, 2013

(30) Foreign Application Priority Data

Dec. 1, 2011 (JP) .................................. 2011-264135
Dec. 1, 2011 (JP) .................................. 2011-264136

(51) Int. Cl.
*H04N 1/60* (2006.01)
*G03G 15/16* (2006.01)

(52) U.S. Cl.
CPC ............. *H04N 1/60* (2013.01); *G03G 15/1605* (2013.01); *G03G 15/169* (2013.01)

(58) Field of Classification Search
CPC combination set(s) only.
See application file for complete search history.

(56) References Cited

U.S. PATENT DOCUMENTS

2003/0133728 A1* 7/2003 Caruthers et al. ............. 399/296

FOREIGN PATENT DOCUMENTS

| JP | 11-24367 A | 1/1999 |
|---|---|---|
| JP | 2003215932 A | 7/2003 |
| JP | 2006-138891 A | 6/2006 |
| JP | 2006-251527 A | 9/2006 |

OTHER PUBLICATIONS

Japanese Notification of Reason for Refusal for Japanese Patent Application No. 2011-264136; Dispatch Dated: Oct. 1, 2013, with English Translation.
Japanese Notification for Reason for Refusal for Japanese Patent Application No. 2011-264135; Dispatch Dated: Oct. 1, 2013; with English Translation.

* cited by examiner

*Primary Examiner* — Barbara Reinier
*Assistant Examiner* — Christopher D Wait
(74) *Attorney, Agent, or Firm* — Cantor Colburn LLP

(57) ABSTRACT

An image forming apparatus includes a photosensitive drum, a developing device, a primary transfer part, a droplet ejecting unit and a controller. On the photosensitive drum, an electrostatic latent image is formed. The developing device forms a toner image by causing a developing agent to adhere to the electrostatic latent image. The primary transfer part transfers the toner image onto an intermediate transfer belt. The droplet ejecting unit ejects droplets onto the toner image on the photosensitive drum after forming the toner image on the photosensitive drum and before transferring the toner image to the transfer member. The controller controls an ejection area of the droplet ejecting unit in accordance with image information of the toner image.

8 Claims, 12 Drawing Sheets

FIG.6

|  | Comparison Example 1 | Comparison Example 2 | Working example 4 | Working example 1 | Working example 2 | Working example 3 | Working example 5 | Comparison Example 3 |
|---|---|---|---|---|---|---|---|---|
| Ejection amount (pl) | 1 | 0.5 | 0.4 | 0.2 | 0.1 | 0.06 | 0.03 | 0 |
| Image quality | Untransferred image exists | Untransferred image exists | Untransferred image exists, but tolerable | Good | Good | Good | Some splashing noted but in a tolerable degree | Splashing exists in the vicinity of character area |
| Judgment | D | D | C | B | B | B | C | D |

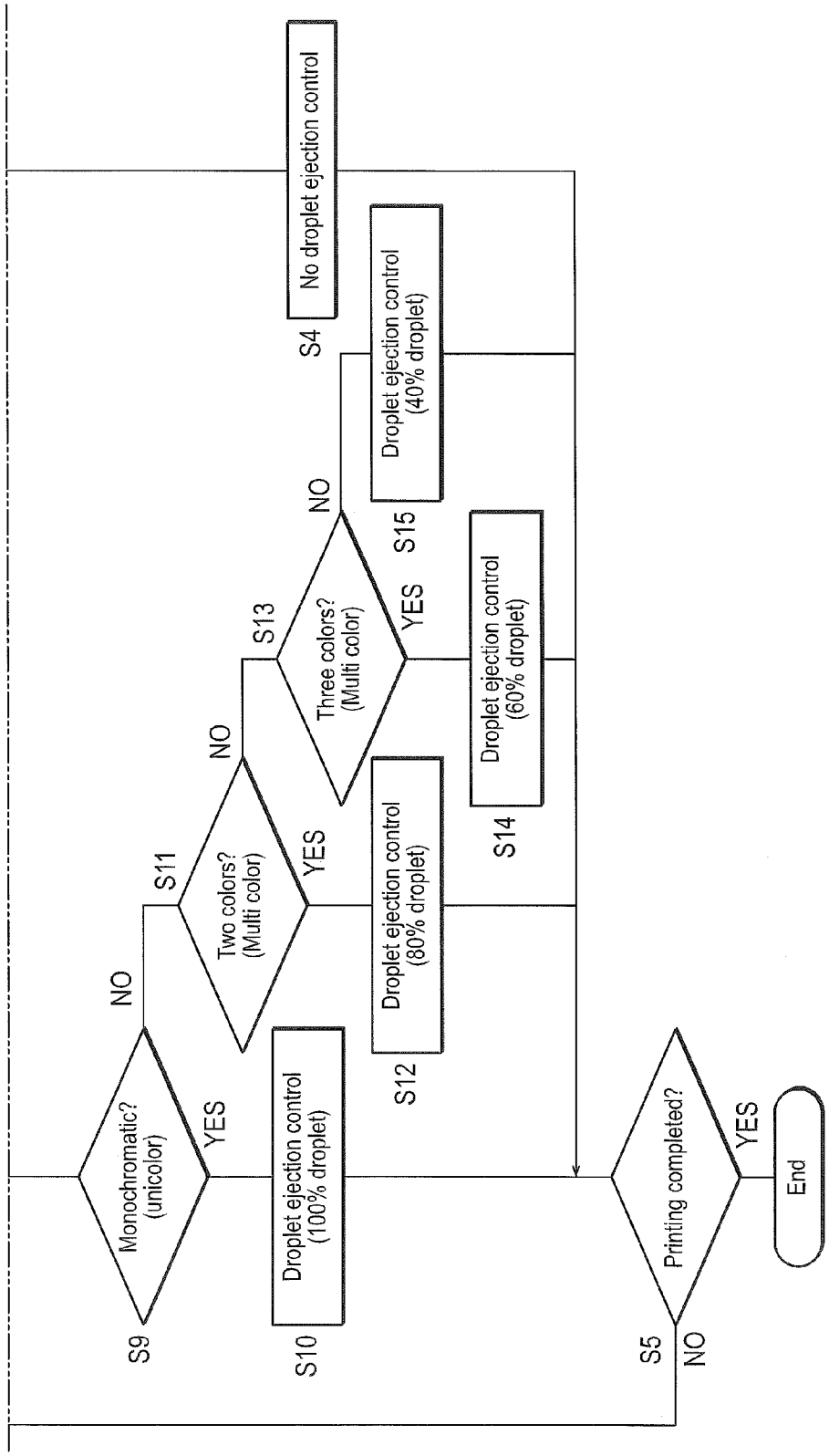

FIG.9

| °C | hPa | Amount of saturated aqueous vapor | | Relative humidity (%RH) | | | | | | | | | |
|---|---|---|---|---|---|---|---|---|---|---|---|---|---|
| | | mol/m³ | g/m³ | 10 | 20 | 30 | 40 | 50 | 60 | 70 | 80 | 90 | 100 |
| 10 | 12.3 | 0.522 | 9.4 | 0.9 | 1.9 | 2.8 | 3.8 | 4.7 | 5.6 | 6.6 | 7.5 | 8.5 | 9.4 |
| 12 | 14.0 | 0.592 | 10.7 | 1.1 | 2.1 | 3.2 | 4.3 | 5.3 | 6.4 | 7.5 | 8.5 | 9.6 | 10.7 |
| 14 | 16.0 | 0.670 | 12.1 | 1.2 | 2.4 | 3.6 | 4.8 | 6.0 | 7.2 | 8.4 | 9.6 | 10.9 | 12.1 |
| 16 | 18.2 | 0.757 | 13.6 | 1.4 | 2.7 | 4.1 | 5.4 | 6.8 | 8.2 | 9.5 | 10.9 | 12.3 | 13.6 |
| 18 | 20.6 | 0.853 | 15.4 | 1.5 | 3.1 | 4.6 | 6.1 | 7.7 | 9.2 | 10.7 | 12.3 | 13.8 | 15.4 |
| 20 | 23.4 | 0.960 | 17.3 | 1.7 | 3.5 | 5.2 | 6.9 | 8.6 | 10.4 | 12.1 | 13.8 | 15.5 | 17.3 |
| 22 | 26.4 | 1.078 | 19.4 | 1.9 | 3.9 | 5.8 | 7.8 | 9.7 | 11.6 | 13.6 | 15.5 | 17.5 | 19.4 |
| 24 | 29.8 | 1.208 | 21.7 | 2.2 | 4.3 | 6.5 | 8.7 | 10.9 | 13.0 | 15.2 | 17.4 | 19.6 | 21.7 |
| 26 | 33.6 | 1.352 | 24.3 | 2.4 | 4.9 | 7.3 | 9.7 | 12.2 | 14.6 | 17.0 | 19.5 | 21.9 | 24.3 |
| 28 | 37.8 | 1.510 | 27.2 | 2.7 | 5.4 | 8.2 | 10.9 | 13.6 | 16.3 | 19.0 | 21.7 | 24.5 | 27.2 |
| 30 | 42.4 | 1.684 | 30.3 | 3.0 | 6.1 | 9.1 | 12.1 | 15.2 | 18.2 | 21.2 | 24.2 | 27.3 | 30.3 |
| 32 | 47.6 | 1.875 | 33.7 | 3.4 | 6.7 | 10.1 | 13.5 | 16.9 | 20.2 | 23.6 | 27.0 | 30.4 | 33.7 |
| 34 | 53.2 | 2.083 | 37.5 | 3.8 | 7.5 | 11.3 | 15.0 | 18.8 | 22.5 | 26.3 | 30.0 | 33.8 | 37.5 |
| 36 | 59.4 | 2.312 | 41.6 | 4.2 | 8.3 | 12.5 | 16.6 | 20.8 | 25.0 | 29.1 | 33.3 | 37.5 | 41.6 |
| 38 | 66.3 | 2.561 | 46.1 | 4.6 | 9.2 | 13.8 | 18.4 | 23.1 | 27.7 | 32.3 | 36.9 | 41.5 | 46.1 |
| 40 | 73.8 | 2.833 | 51.0 | 5.1 | 10.2 | 15.3 | 20.4 | 25.5 | 30.6 | 35.7 | 40.8 | 45.9 | 51.0 |

FIG.10

| °C | Relative humidity (%RH) | | | | | | | |
|---|---|---|---|---|---|---|---|---|
| | 10 | 20 | 30 | 40 | 50 | 60 | 70 | 80 |
| 10 | D | — | — | — | — | D | — | — |
| 20 | D | — | — | D | C | B | A | A |
| 30 | D | D | C | B | A | — | — | A |

FIG.11

| °C | Relative humidity (%RH) | | | | | | | |
|---|---|---|---|---|---|---|---|---|
| | 10 | 20 | 30 | 40 | 50 | 60 | 70 | 80 |
| 10 | B | — | — | — | — | B | — | — |
| 20 | B | — | — | B | A | B | A | C (image) |
| 30 | B | B | A | B | A | — | C (image) | D (image) |

FIG.12

| °C | Relative humidity (%RH) | | | | | | | |
|---|---|---|---|---|---|---|---|---|
| | 10 | 20 | 30 | 40 | 50 | 60 | 70 | 80 |
| 10 | B | — | — | — | — | B | — | — |
| 20 | B | — | — | B | A | B | A | A |
| 30 | B | B | A | B | A | — | — | A |

FIG.13

| Volume of droplet ejected (ejection amount) | | Monochromatic | | Two colors | | Three colors | | Four colors | |
|---|---|---|---|---|---|---|---|---|---|
| [%] | [pl] | Scattering transfer | Image distortion | Scattering transfer | Image distortion | Scattering transfer | Image distortion | Scattering transfer | Image distortion |
| 0 | 0 | D | B | D | B | D | B | D | B |
| 20 | 0.04 | C | B | C | B | C | B | C | B |
| 40 | 0.08 | B | B | B | B | B | B | B | B |
| 60 | 0.12 | B | B | B | B | B | B | B | C |
| 80 | 0.16 | A | B | A | C | A | C | A | D |
| 100 (standard value) | 0.2 | A | B | A | | A | D | A | D |

ELECTROSTATIGRAPHIC IMAGE FORMING APPARATUS WITH DROPLET EJECTING UNIT

CROSS-REFERENCE TO RELATED APPLICATION

This application is based on Japanese Patent Application Nos. 2011-264135 and 2011-264136 filed on Dec. 1, 2011, the contents of which are incorporated herein by reference.

BACKGROUND

1. Technical Field

The present invention relates to an image forming apparatus for forming high quality images.

2. Description of Related Art

Generally speaking, an image forming apparatus first charges a photosensitive member and then erases electric charges in accordance with a document image, in other words, conducts an exposure process, in order to form an electrostatic latent image. Using a developing device, toner is then attached to the electrostatic latent image formed on the photosensitive member. The toner thus attached to the photosensitive member is then transferred to a transfer member such as an intermediate transfer belt and a sheet of paper to produce a printed image.

At this point, if the amount of electric charges is more than the appropriate amount, toner particles of the same polarity repulse each other causing them to be displaced from the positions they are supposed to be, which in turn causes scattering (scattering transfer) and distortion of printed images (image distortion) sometimes. Scattering transfers and image distortions occur more conspicuously in case of high contrast toner images, such as character images, than in photographic images. Therefore, various existing technologies for suppressing scattering transfer and the like have been developed primarily for such high contrast toner images.

For example, the technology disclosed by Publication of Unexamined Japanese Patent Application No. 2006-138891 is intended to lower the electric charge of toner formed on the photosensitive member or the intermediate transfer belt to a proper value by using a static eliminator and to prevent the repulsion between toner particles.

However, since the charge amount required varies with each type of image, adjusting the charge amount for a specific image by means of a static eliminator, the adjusted charge amount for another image can be insufficient or excessive to cause scattering transfer.

SUMMARY

The present invention is made in order to solve the above-mentioned problem associated with the related art, and to provide an image forming apparatus capable of forming high quality images by suppressing the occurrence of scattering transfers and image distortions without causing any bad effect to printing paper.

To achieve at least one of the above mentioned objects, an image forming apparatus reflecting one aspect of the present invention comprises: an image carrying member on which an electrostatic latent image is formed; a developing part for forming a toner image by causing a developing agent to adhere to the electrostatic latent image; a transfer part for transferring the toner image onto a transfer member; a droplet ejecting unit for ejecting droplets onto the toner image on the image carrying member after forming the toner image on the image carrying member and before transferring the toner image to the transfer member; and a controller for controlling an ejection area of the droplet ejecting unit in accordance with image information of the toner image.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 6 is a table showing an experimental result indicating the relation between the image quality and the ejection amount in comparison examples 1-3 and working examples 1-5 of the first embodiment.

FIGS. 8A and 8B show a flowchart of assistance in explaining the method of controlling droplet ejection according to a second embodiment of the present invention.

FIG. 9 is table showing the relation between amount of saturated aqueous vapor, relative humidity, absolute humidity, and temperature.

FIG. 10 is a table showing an experimental result indicating the relation between the occurrence of scattering transfer and the like, temperature, and relative humidity in case when the droplets are not ejected.

FIG. 11 is a table showing an experimental result indicating the relation between the occurrence of scattering transfer and the like, temperature, and relative humidity in case of a droplet ejection control without using a threshold value.

FIG. 12 is a table showing an experimental result indicating the relation between the occurrence of scattering transfer and the like, temperature, and relative humidity in a working example 1 of the second embodiment.

FIG. 13 is a table showing an experimental result indicating the relation between the occurrence of scattering transfer and the like, the volume of droplet, and the number of toner image colors in a working example 2 of the second embodiment.

DETAILED DESCRIPTION

The embodiments of the present invention will be described in detail below with reference to the accompanying drawings. The following description is intended for showing examples of embodiments of the invention described in claims, and by no means intended to limit its scope of technology or the meanings of the terms used. The scaling factors of the drawings may vary from those of the actual components because of intentional exaggerations for the sake of explanations.

Figure 1:
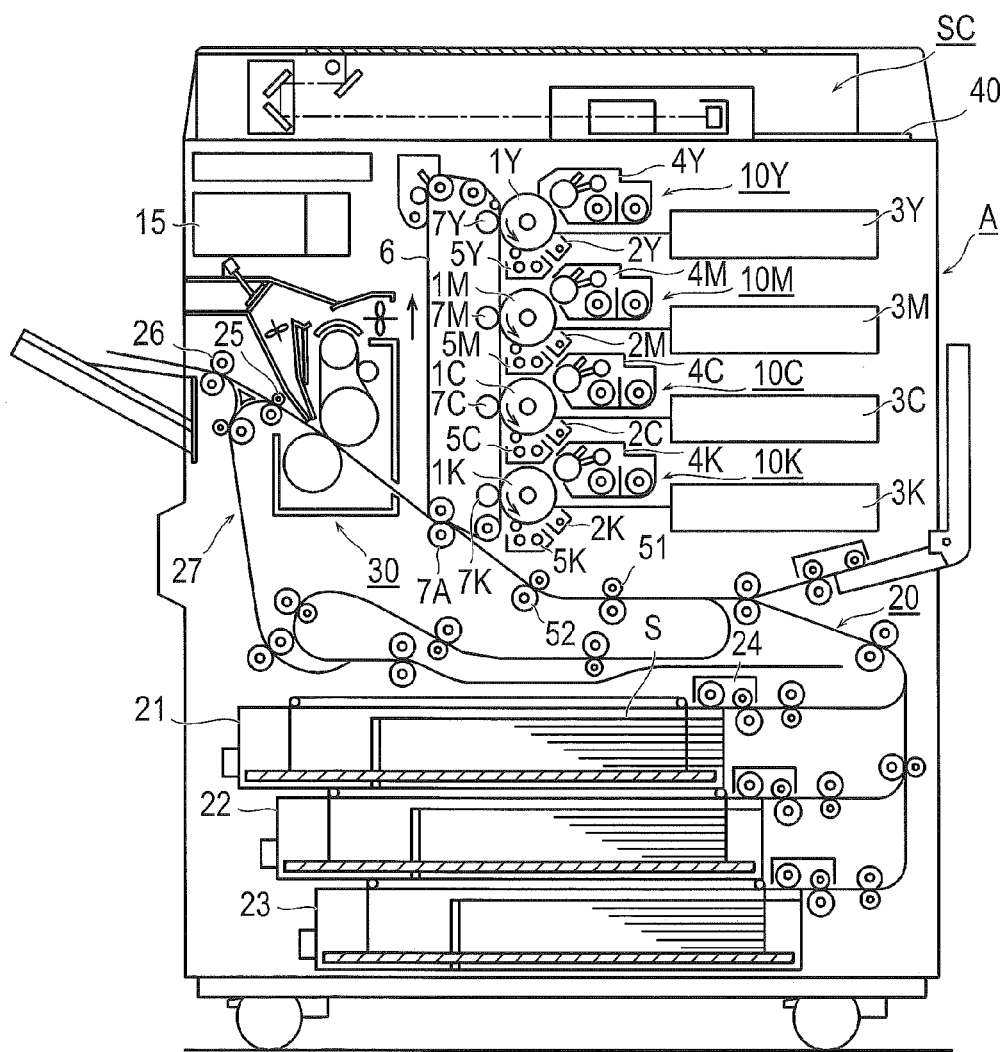
FIG. 1 is a cross-sectional diagram of assistance in explaining the constitution of an image forming apparatus according to a first embodiment of the present invention.
Figure 2:
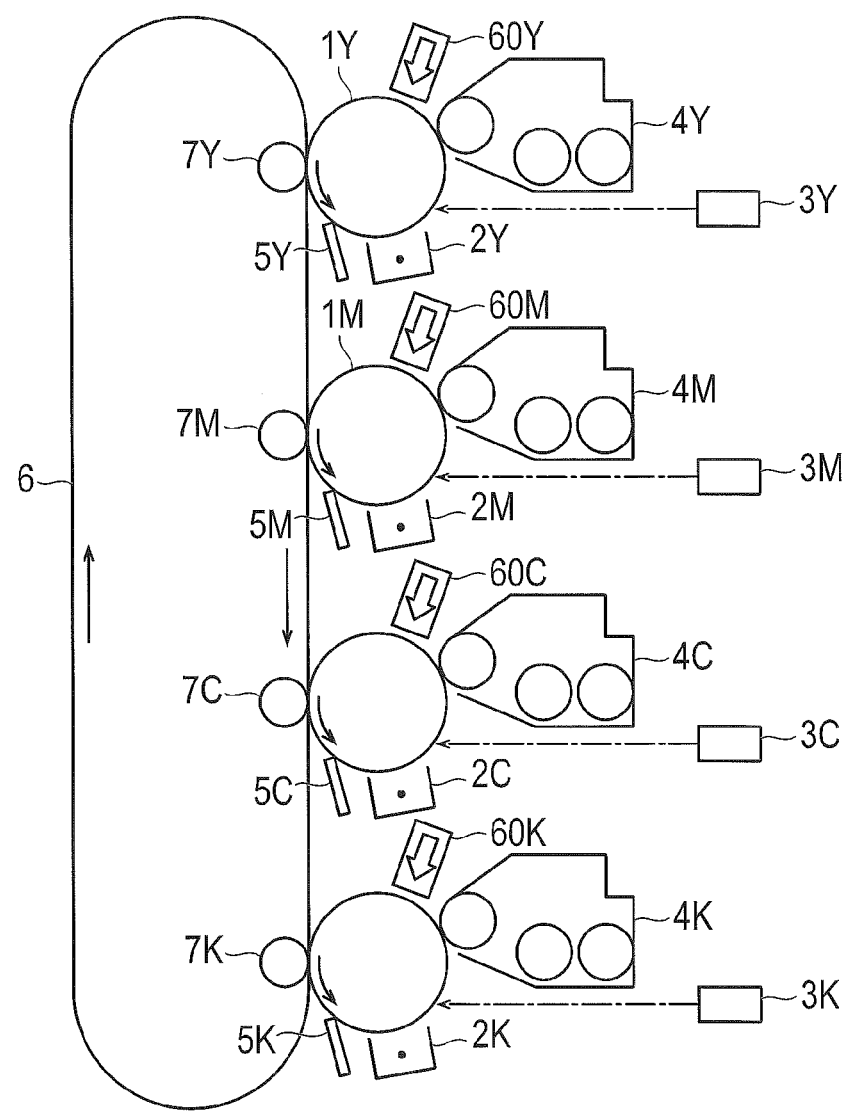
FIG. 2 is an enlarged diagram of the vicinity of the intermediate transfer belt shown in FIG. 1.

FIG. 1 is a cross-sectional diagram of assistance in explaining the constitution of an image forming apparatus A according to a first embodiment of the present invention, and FIG. 2 is an enlarged diagram of the vicinity of the intermediate transfer belt shown in FIG. 1.

The image forming apparatus A is what is normally called the tandem-type color image forming apparatus, which forms color images using its four sets of image forming units.

A document placed on a document platen is exposed to the scanning/exposure light of the optical system of the image scanning apparatus SC and its image is read by the line image sensor. The image information signal, thus photoelectrically converted, is inputted into an optical writing device of the image forming unit after various processes at the image information processing unit (see FIG. 3) including A/D conversion, shading compensation, and image compression process.

The four sets of image forming units 20 include an image forming unit 10Y that forms an yellow (Y) color image, an image forming unit 10M that forms a magenta (M) color image, an image forming unit 10C that forms a cyan (C) color image, and an image forming unit 10K that forms a black (K) color image, each of which is identified here with a symbol representing each color, i.e., Y, M, C, and K respectively following the common symbol 10.

The image forming unit 10Y consists of a photosensitive drum (an image carrying member) 1Y, a charging device 2Y, an optical writing device 3Y, a developing device (developing part) 4Y, a drum cleaner 5Y, and a droplet ejecting unit 60Y provided on the periphery thereof.

Similarly, the image forming unit 10M consists of a charging device 2M, an optical writing device 3M, a developing device 4M, a drum cleaner 5M, and a droplet ejecting unit 60M provided on the periphery of a photosensitive drum 1M; the image forming unit 10C consists of a charging device 2C, an optical writing device 3C, a developing device 4C, a drum cleaner 5C, and a droplet ejecting unit 60C provided on the periphery of a photosensitive drum 1C; and the image forming unit 10K consists of a charging device 2K, an optical writing device 3K, a developing device 4K, a drum cleaner 5K, and a droplet ejecting unit 60K provided on the periphery of a photosensitive drum 1K.

The photosensitive drums 1Y, 1M, 1C, and 1K, the charging devices 2Y, 2M, 2C, and 2K, the optical writing devices 3Y, 3M, 3C, and 3K, the developing devices 4Y, 4M, 4C, and 4K, as well as the drum cleaners 5Y, 5M, 5C, and 5K, and the droplet ejecting units 60Y, 60M, 60C, and 60K the image forming units 10Y, 10M, 10C, and 10K respectively have common contents. Therefore, they are described in the following descriptions without specific symbols Y, M, C, and K unless it is necessary to show their distinctions.

The image forming unit 10 exposes the photosensitive drum 1 to the exposure light by using the optical writing device 3 in which the image information signal is inputted, to form an electrostatic latent image on the photosensitive drum 1 based on the image information signal. The electrostatic latent image is developed by the developing device 4 to form a toner image as a visible image on the photosensitive drum 1.

Yellow (Y), magenta (M), cyan (C), and black (K) images are formed on the photosensitive drums 1Y, 1M, 1C, and 1K of the image forming units 10Y, 10M, 10C, and 10K respectively.

An intermediate transfer belt (as a transfer member and a transfer part) 6 winds around a plurality of rollers and thus is movably supported.

The toner images of various colors formed by the image forming units 10Y, 10M, 10C, and 10K are transferred one by one onto the running intermediate transfer belt 6 by means of the primary transfer parts 7Y, 7M, 7C, and 7K to form a toner image of a color image consisting of Y (yellow), M (magenta), C (cyan), and K (black) color layers overlaid one on top of each other.

The paper transport part 20 transports the printing paper S. Several types of printing paper including thick and thin paper are stored in the paper supply trays 21, 22 and 23 to be supplied by a first paper supply part 24. A sheet of printing paper S is transported to a secondary transfer part 7A via a pair of loop forming rollers 51 and a pair of resist rollers 52 that forms a sheet alignment device, to have a toner image of the color image formed on the intermediate transfer belt 6 formed on its surface. Next, heat and pressure is applied on the sheet S by a fixing device 30 in order to fix the toner image of the color image transferred in the previous step, and the sheet S is discharged outside of the apparatus via a fixation transport roller 25 and a paper discharge roller 26.

The image forming apparatus A is also equipped with a paper turning section 27 for making it possible to discharge a sheet turned over after fixation by sending it from the fixation transport roller 25 to the paper turning section 27, or forming another image on the turned over side (i.e., forming images on both sides of a sheet).

Using an operating display device 40 provided at the top of the main unit of the image forming apparatus A, various attributes of the sheet to be used including the type, size, and number of sheets can be set for the sheet S to be used among various types of paper in forming an image. It can also be configured to have the sheet size automatically set when the document is read by the image scanning device SC.

Next, the method of controlling droplet ejection according to the first embodiment is described below.

Figure 3:
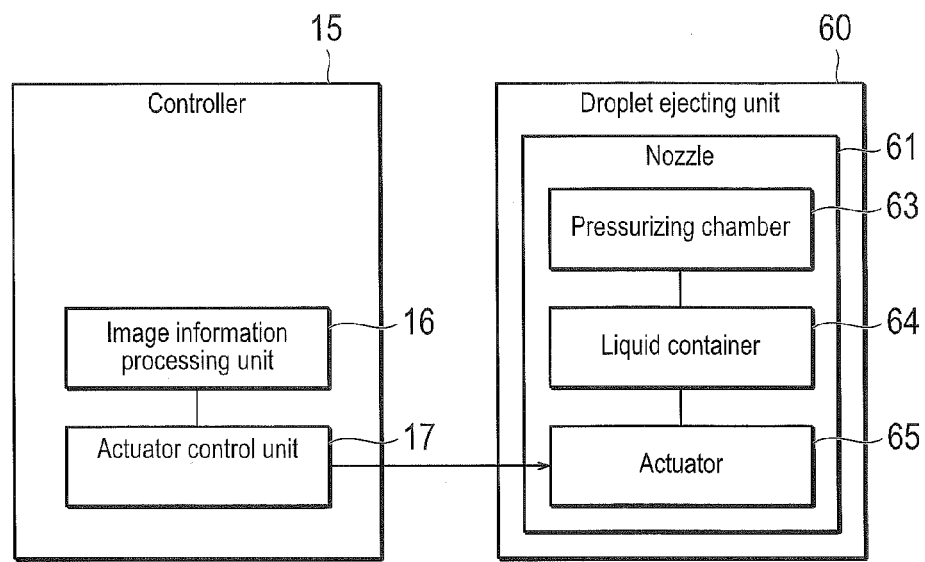
FIG. 3 is a block diagram of assistance in explaining the constitution of the droplet ejecting unit shown in FIG. 2.
Figure 4:
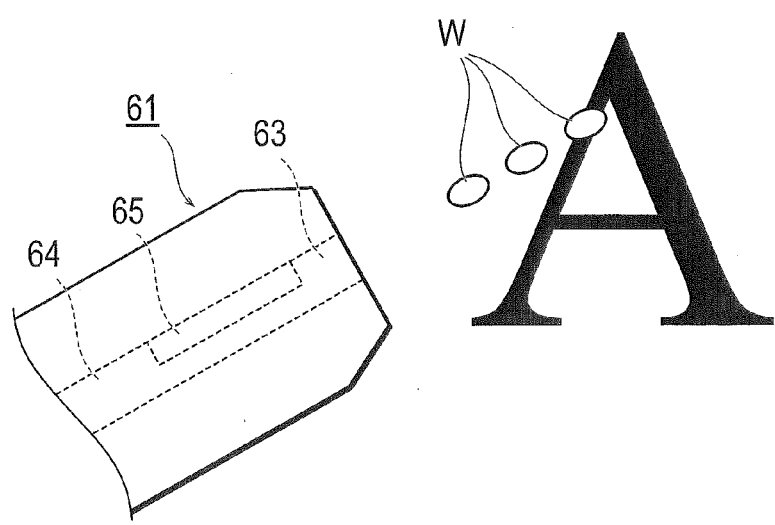
FIG. 4 is a schematic diagram of assistance in explaining the nozzle provided as the tip of the droplet ejecting unit.

FIG. 3 is a block diagram of assistance in explaining the constitution of the droplet ejecting unit shown in FIG. 2, and FIG. 4 is a schematic diagram of assistance in explaining the nozzle provided as the tip of the droplet ejecting unit.

As shown in FIG. 3, the droplet ejecting unit 60 is connected to the controller 15 and controlled by the instructions of the controller 15. The controller 15 which has the aforementioned image information processing unit 16 and an actuator control unit 17 sends signals to various parts of the image forming apparatus.

The actuator control unit 17 controls an actuator 65 (to be described later) of the droplet ejecting unit 60 based on the image information obtained from the image information processing unit 16. The droplet volume (ejection amount) ejected from a nozzle 61 of the droplet ejecting unit 60 and the ejection range can be adjusted (modified) by controlling the actuator 65 with the actuator control unit 17.

The droplet ejecting unit 60 according to the first embodiment ejects droplets W on the toner image on the photosensitive drum 1 after the toner image is formed on the photosensitive drum 1 but before it is transferred to the intermediate transfer belt 6. As shown in FIG. 2, the droplet ejecting unit 60 is provided on the downstream side of the developing device 4 relative to the rotation direction of the photosensitive drum 1.

The droplet ejecting unit 60 is incorporated with the inkjet technology of the printer the constitution of which is publicly known so that its description in omitted here, and includes the nozzle 61 for ejecting droplets W onto the photosensitive drum 1 as schematically shown in FIG. 3. As shown in FIG. 3 and FIG. 4, the nozzle 61 has a pressurizing chamber 63 as a space in which the liquid that provides droplets is pressurized, a liquid container 64 that contains the liquid to be supplied to the pressurizing chamber 63, and the actuator 65 that pressurizes the liquid in the liquid container 64 in order to eject droplets W from the nozzle 61.

The actuator 65 has an electrode and a vibrator plate, and the ejection of the droplets W is implemented by deforming the vibrator plate by applying voltage to the electrode thereby changing the internal pressure of the pressurizing chamber 63. As the nozzles 61 eject droplets corresponding in terms of pixel unit according to the toner image, they are arranged so as to form a line head.

In the first embodiment having the constitution as described above, the amount (volume) of droplets W and the ejection range are controlled in order to prevent the sheet from swelling up and product quality degradation which may result from the ejection of an excessive amount of liquid.

The ejection of droplets is implemented in terms of pixel unit. For example, the ink jet mechanism used on the image forming apparatus is capable of ejecting a droplet having the volume on the order of 1-2 pl regardless of whether it is based on the piezo system or the thermal system. However, if the droplet W of such a size is constituted of water or aqueous solution, it may cause distortions in the toner image on the photosensitive drum 1. On the other hand, if further smaller droplets W are ejected 100% for all the pixels, it may end up supplying water excessively, which in turn results in swelling up of the sheet to cause transfer failures on the overall image. Moreover, if in case water is used in a vapor form, supplying the generated water vapor over the entire sheet, the sheet gets wet excessively, hence resulting in swelling of the sheet and degradation of the product quality.

Consequently, it is so designed in the first embodiment to detect the point of highest contrast from the image information obtained by the image information processing unit 16 and eject the required droplets W in terms of pixel unit. In other words, it ejects micro droplets so that no distortion of toner image occurs and transferred images remain sharp. Moreover, since droplets are ejected only on the outline of a toner image and its vicinity rather than ejecting droplets all over the sheet so that swelling of the sheet and degradation of product quality can be avoided. This also prevents the toner containing unnecessary amount of water from being transferred, consequently unnecessary amount of energy in the fixing device, and causing improper fixation. The "vicinity" of the toner image here means the area on the vicinity outside of the toner image where no toner is adhered to, as well as the area where there might be some droplets which would not cause any swelling spreading over the entire sheet or to the area where no toner is adhered to.

The volume (ejection amount) of droplet from the nozzle 61 can be defined as follows.

First, let us assume a case of ejecting droplets W in one layer to cover the entire surface of a sheet of paper, for example, of A4 size, and calculate the total amount of micro droplets W required. Next, convert the calculated total volume (total amount of droplets W required per each sheet) to the quantity of droplets required for each pixel unit.

For example, if we assume toner particles with a diameter of 6 μm are solidly covering in a single layer (filling the surface with maximum density) the entire surface of the photosensitive drum 1, and water drop with a diameter of 3 μm and a thickness of 1 μm is filling the gaps between the toner particles attached to the surface, the necessary amount be ejected is approximately 0.025 cc per A4 size sheet.

If the resolution is 600 dpi, the number of pixels is 4960×7015=34794400 so that the volume of droplet per pixel is approximately $7.18 \times 10^{-10}$ cc. The droplet volume in the ink-jet system is normally expressed not in cc but in pl (pico liter) so that the above value should be expressed as approximately 0.000718 pl.

If we assume that the volume of a micro droplet W is 0.1 pl, it amounts to the volume required for approximately 140 pixels because the amount required for each pixel is 0.000718 pl, so that it is safe to assume that ejecting 0.1 pl does not cause any image distortion as it is far smaller than a toner with a diameter of 6 μm. The appropriate amount of ejection required is describe below with reference to the working examples 1 and 2 (to be described later) where the experiment is conducted regarding the amount of ejection required for preventing scattering transfer, etc.

The liquid used for the droplet W can be anything that can strengthen the liquid bridging force between toner particles to prevent the repulsion between the toner particles and to enhance the aggregation force of the toner particles. For example, pure water or a mixture of aqueous organic solvent and pure water can be used for that purpose. Aqueous organic solvent can be prepared by adding antiseptics, antioxidants, fungicides, pH adjusting agents and other useful agents to a polyethylene glycol solution used as a surfactant and defoaming agent diluted to approximately 10:1. Mixing pure water with such an aqueous organic solution enables to improve the hydrophilic property of the hydrophobized toner in order to prevent the repulsion between the toner particles, hence to prevent scattering transfer.

Figure 5:
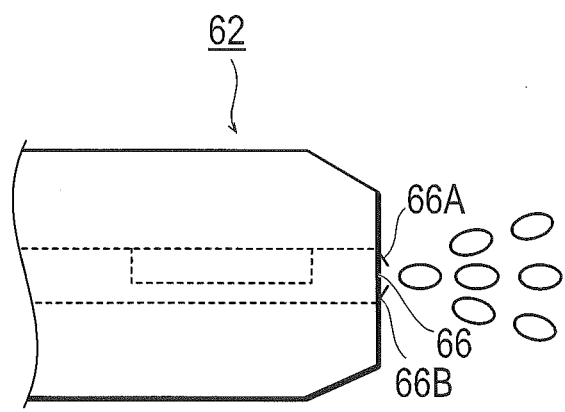
FIG. 5 is a side view of assistance in explaining a variation example of the nozzle.

FIG. 5 is a side view of assistance in explaining a variation example of the nozzle.

The nozzle for ejecting droplets is not limited to the nozzle 61 shown in FIG. 4 and the nozzle 62 shown in FIG. 5 can also be used. The nozzle 62 has protrusions 66A and 66B provided at two places (top end and bottom end in the figure) of the tip of the ejection port 66. The protrusions 66A and 66B have the length of approximately 1-2 μm and their tips are tilted toward each other in order to locate them close to each other. Therefore the use of the nozzle 62 makes it possible to adjust the droplet more finely compared to the nozzle 61 and to make it applicable to high speed ejection by adjusting the ejection timing of the droplet ejecting unit 60 by means of the controller 15.

Next, let us describe about the results of the experiment with the droplet ejecting unit 60 concerning the ejection amount necessary for the prevention of scattering transfer and the like conducted on 8 cases, or the working examples 1-5 and the comparison examples 1-3 in order to check the image quality.

The working example 1 was conducted using: a photosensitive drum with a diameter of 100 mm, driven at a linear speed of 400 mm/sec, and having a surface potential of −600 V; a developing roller with a diameter of 25 mm, driven at a linear speed of 720 mm/sec, and applied with a developing voltage Vac of 1.0 kVpp, a 9 kHz rectangular wave, and Vdc of −400V; and a two-component developing agent consisting of a ferrite coated carrier with a particle diameter of 30 μm and toners with particle diameter of 6.5 μm and toner density of 7.5%. The nozzle used here was the nozzle 61 shown in FIG. 4.

In the working example 1, a mixed solvent was ejected to the character outline based on the image information for a character chart image where the coverage (coverage rate) of each of Y, M, C and K colors is 6%. The character chart was prepared by forming characters on the entire surface of the image area and the character chart image consisted of black images where splashing can be easily noticed and overlapping RGB images. The ejection amount was 0.2 pl. The mixed solvent consisted of pure water and an aqueous organic solvent, which was added with surfactants, antiseptics, antioxidants, defoaming agents, fungicides, pH adjusting agents, etc., and adjusted to have affinity with the toner on the photosensitive drum.

The working example 2 was conducted with the same condition as the working example 1 except that the ejection amount of the nozzle 61 was 0.1 pl.

The nozzle used in the working example 3 was the nozzle 62 shown in FIG. 5. A mixed solvent was ejected to the graphic profile area based on the image information for a mixed image consisting of a character chart with image coverage of 20% for each of the colors Y, M, C and K and a graphic chart. The mixed image consisted of black images where splashing can be easily noticed and overlapping RGB images. The ejection amount was 0.06 pl. Other conditions were the same as those of the working example 1.

The working example 4 was conducted with the same condition as the working example 1 except that the ejection amount of the nozzle 61 was 0.4 pl.

The nozzle used in the working example 5 was the nozzle 62 shown in FIG. 5 and the ejection amount was 0.03 pl. Other conditions were the same as those of the working example 1.

The test conditions of the comparison examples 1, 2 and 3 are the same as that of the working example 1 except that the ejection amounts were 1 pl, 0.5 pl and 0 pl (no droplet ejection) respectively.

FIG. 6 is a table showing an experimental result indicating the relation between the image quality and the ejection amount in working examples 1-5 and comparison examples 1-3.

As it is clear from the chart of FIG. 6, untransferred images occurred and prevented us from achieving images of good quality because of excessive ejections in the comparison examples 1 and 2. In the comparison example 3, toner splashing occurred in the vicinity of the character area which prevented us from obtaining images of good quality.

On the contrary, in the working examples 1-3, it was possible to prevent the occurrence of scattering transfers and image distortions by properly aggregating toner particles with the use of micro droplets, thus achieving good image quality. Although untransferred images occurred in the working example 4, the image quality was that of tolerable level. In the comparison example 5, although toner splashing occurred in the vicinity of the character area, the image quality was that of tolerable level.

In the working examples 1-3, it was possible to achieve a good image quality by ejecting in the ejection amount range of 0.06-0.2 pl from the nozzle of the droplet ejecting unit 60, thus preventing the occurrence of scattering transfers and image distortions generated by the repulsion between toner particles. It was learned that the tolerable level of ejection amount can be in the range of 0.03-0.4 pl.

Although the droplet W was ejected by the droplet ejecting unit 60 during the image transfer from the photosensitive drum 1 to the intermediate transfer belt 6 in the above cases, the invention should not be limited to this embodiment. For example, the droplet W can be ejected during the transfer from the intermediate transfer belt 6 to the sheet S (during the secondary transfer), or during the transfer from the photosensitive drum to the sheet in an image forming apparatus to which a direct transfer system which does not use the intermediate transfer is applied. Since scattering transfer and the like occur on a sheet of paper, they can be directly prevented by ejecting droplets during the transfer of images to the sheet.

Consequently, the image forming apparatus according to the first embodiment is equipped with the droplet ejecting unit 60 that ejects micro droplets in terms of pixel unit after the formation of the toner image on the photosensitive drum 1 and prior to the transfer of the toner image to the intermediate transfer belt 6, wherein the ejection of droplets onto the toner image intensifies the aggregating power among the toner particles, which in turn prevents the occurrence of scattering transfers and image distortions under the influence of the electric field during the transfer process, allowing us to obtain a high contrast and stable image (better image quality), preventing the degradation of the product quality otherwise caused swelling of the sheet due to an excessive amount of droplets adhering to it, and enabling us to save the amount of liquid ejected at the same time. Moreover, since water is used as a droplet, it never causes any clogging in the system when it dries, making the system more reliable than in the case of using ink.

Next, let us describe a second embodiment.

Figure 7:
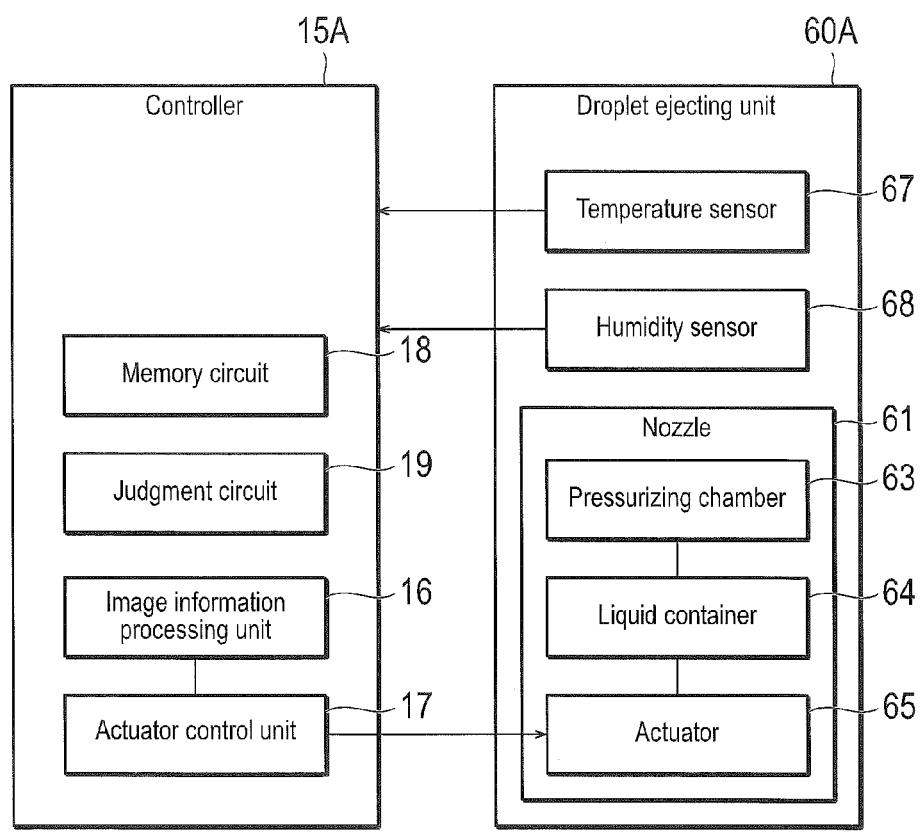
FIG. 7 is a block diagram of assistance in explaining the constitution of the droplet ejecting unit according to a second embodiment of the present invention.

FIG. 7 is a block diagram of assistance in explaining the constitution of the droplet ejecting unit according to the second embodiment of the present invention.

In the second embodiment, the droplet ejection is controlled based on the image information and the image forming condition, so that it is generally different from the first embodiment in the constitutions of the controller and the droplet ejecting unit.

More specifically, the controller 15A according to the second embodiment has a memory circuit 18 and a judgment circuit 19 in addition to the image information processing unit 16 and the actuator control unit 17. The memory circuit 18 has a table that corresponds to the temperature and the amount of saturated aqueous vapor. The judgment circuit 19 is used to determine the ejection amount based on the image information and the image forming condition.

The droplet ejecting unit 60A according to the second embodiment has a temperature sensor 67 and a humidity sensor 68 in addition to the nozzle 61 (see FIG. 4). The temperature sensor 67 and the humidity sensor 68 are provided in the vicinity of the photosensitive drum 1 to detect the ambient temperature and humidity.

In order to avoid the duplication of the descriptions made in the first embodiment, the descriptions of the image information processing unit 16, the actuator control unit 17, and the nozzle 61 are omitted here. The droplet ejecting unit 60A is exchangeable with the nozzle 62 shown in FIG. 5. In contrast to the use of nozzle 61, the use of the nozzle 62 makes it possible to make droplets further finer, and to makes it applicable to high speed ejection by means of adjusting it with the controller 15A.

Similar to the first embodiment, the second embodiment allows to eject droplets only to the areas, such as character areas, where scattering transfer are more noticeable within the toner image formed (e.g., areas on the photosensitive drum 1 where droplet ejection is needed), not everywhere on the sheet, so that degradation of the product quality such as swelling of the sheet can be prevented. It can also prevent the necessity of abnormal amount of energy for fixation in the fixing device, or the occurrence of poor fixation due to the transfer of the toner containing an excessive amount of water. It is confirmed that the volume (ejection amount) of droplet from the nozzle 61A within the range of 0.06-0.2 pl does not cause any scattering transfer and the like according to the experiment related to the first embodiment.

Next, the method of controlling the droplet ejection according to the second embodiment is described below.

Figure 8A:
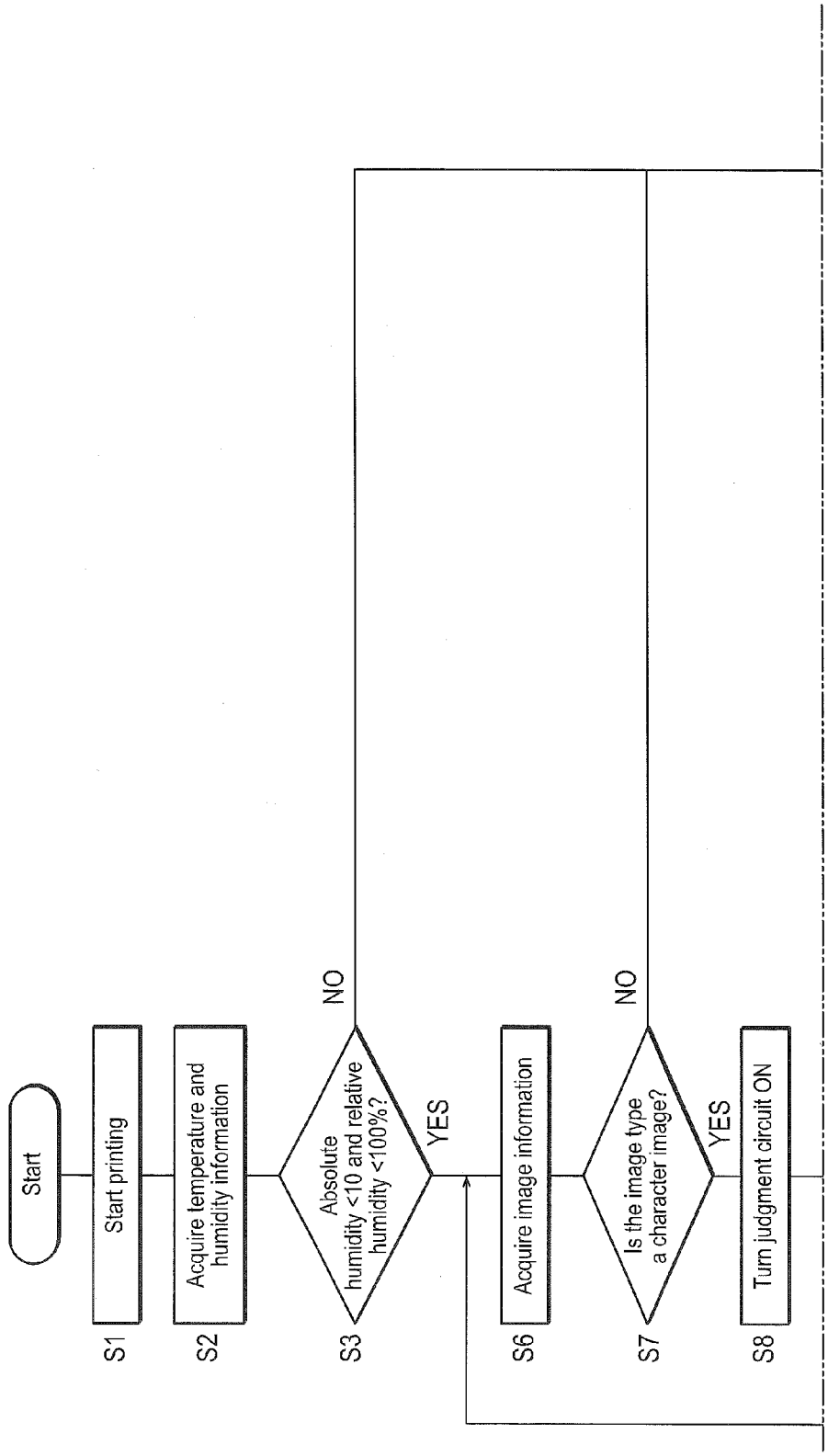

FIGS. 8A and 8B show a flowchart of assistance in explaining the droplet ejection control method based on the image information and the image forming condition.

When the printing start button is pressed in the operating display device 40, the controller 15A obtains the information including the number of copies to be printed, the type and size of the sheet, etc. set up in the operating display device 40 (step S1).

Next, the controller 15A acquires the information concerning the ambient temperature and humidity via the temperature sensor 67 and the humidity sensor 68 provided in the vicinity of the photosensitive drum 1 (step S2), as well as the table concerning the temperature and the amount of saturated aqueous vapor from the memory circuit 18 provided on the controller 15A, to calculate the relative humidity from the detected temperature and the amount of saturated aqueous vapor.

The controller 15A makes a judgment on whether or not the obtained absolute humidity is below 10 and the relative humidity is below 100% (step S3). If the absolute humidity is equal or higher than 10 and the relative humidity is 100% (step S3: No), the controller 15A sends the control signal for setting the judgment circuit 19 to OFF and executing the printing action without ejecting the droplet to the nozzle 61 (step S4). After that, the printing action is repeated until the number of prints of the specified document image reaches the specified number of copies (step S5).

If the absolute humidity is below 10 and the relative humidity is below 100% (step S3: Yes), the controller 15A acquires the image information read by the image scanning device SC (step S6). The controller 15A makes a judgment of the image type of the image information (step S7). The type of image is an image for which the toner is coated over a wider area such as a photograph image, or a character image.

If the image information does not contain any character and the type of image is not a character image (step S7: No), the controller 15A sends the control signal for setting the judgment circuit 19 to OFF and executing the printing action without ejecting the droplet to the nozzle 61 (step S4). After that, the printing action is repeated until the number of prints of the specified document image reaches the specified number of copies (step S5).

If the image information contains characters, and the type of image is a character image (step S7: Yes), the controller 15A turns the judgment circuit 190N (step S8), and a judgment is made as to whether the area to which droplets are to be ejected consists of a monochromatic color or not (step S9). If the particular area is monochromatic (step S9: Yes), the controller 15A sends the control signal for executing the printing action after ejecting the droplets having the necessary volume based on the image forming condition onto the photosensitive drum 1 to the nozzle 61 (step S10). The image forming condition is the ambient temperature and humidity condition around the photosensitive drum 1. After that, the printing action is repeated until the number of prints of the specified document image reaches the specified number of copies (step S5).

If the area to which droplets are to be ejected is not monochromatic (step S9: No), the controller 15A makes a judgment whether or not the particular area is constituted of two colors or not (step S11). If the particular area consists of two colors (step S11: Yes), the controller 15A sends a control signal for executing the printing action after ejecting the droplets having 80% of the necessary volume based on the image forming condition onto the photosensitive drum 1 to the nozzle 61 (step S12). After that, the printing action is repeated until the number of prints of the specified document image reaches the specified number of copies (step S5).

If the area to which droplets are to be ejected does not consist of two colors (step S11: No), the controller 15A makes a judgment whether or not the particular area is constituted of three colors or not (step S13). If the particular area consists of three colors (step S13: Yes), the controller 15A sends a control signal for executing the printing action after ejecting the droplets having 60% of the necessary volume based on the image forming condition onto the photosensitive drum 1 to the nozzle 61 (step S14). After that, the printing action is repeated until the number of prints of the specified document image reaches the specified number of copies (step S5).

If the area to which droplets are to be ejected does not consist of three colors (consist of four colors) (step S13: No), the controller 15A sends a control signal for executing the printing action after ejecting the droplets having 40% of the necessary volume based on the image forming condition onto the photosensitive drum 1 to the nozzle 61 (step S15). After that, the printing action is repeated until the number of prints of the specified document image reaches the specified number of copies (step S5).

As to the reason why the value of the absolute humidity serving as one of the criterion of judgment was set to 10 in the step S3 of the flowchart, an explanation can be found in the working example 1 to be described later. As to the reason why it is set not to eject droplets, it is because there is a sufficient amount of water in the air when the relative humidity is 100% and the ejection of droplets would cause image distortions. As to the reason why the volume of droplet (ejection amount) is selected as 80%, 60%, and 40% respectively of the volume required based on the image forming condition in the steps S12, S14, and S15, an explanation can be found in the working example 2 to be described later.

Next, let us describe the experiments conducted in two cases, i.e., the working examples 1 and 2, to check the image quality in each case related to the control of the droplet ejection when it is implemented considering the image information and the image forming conditions such as the temperature and humidity in the vicinity of the intermediate transfer belt. If the image forming condition was not considered, the result is the same as that of the first embodiment (see FIG. 6).

First, the working example 1 is described.

FIG. 9 shows the table showing the relation between the amount of saturated aqueous vapor, relative humidity, absolute humidity, and temperature, and FIG. 10 is a table showing the results of an experiment indicating the relation between the occurrence of scattering transfer and the like, temperature and relative humidity for the case where droplets were not ejected.

Of various symbols used in Table 10, "A" represents a condition where 3 pt characters are easily legible. "B" represents a condition where 3 pt characters are legible, some scattering transfer exist but in a tolerable degree, and some image distortions exist but with no distortion in 3 pt characters. "C" represents a condition where a few scattering transfer are noticeable in 3 pt characters, and there is no problem in 5 pt characters. "C (image)" represents the existence of minor image distortions in 3 pt characters. "D" represents a condition where 3 pt characters are crushed because of scattering transfer. "D (image)" represents the existence of image distortion in 3 pt characters.

The working example 1 was conducted using: a photosensitive drum with a diameter of 100 mm, driven at a linear speed of 400 mm/sec, and having a surface potential of −600 V; a developing roller with a diameter of 25 mm, driven at a linear speed of 720 mm/sec, and applied with a developing voltage Vac of 1.0 kVpp, a 9 kHz rectangular wave, and Vdc of −400V; and a two-component developing agent consisting of a ferrite coated carrier with a particle diameter of 30 μm and toners with particle diameter of 6.5 μm and toner density of 7.5%. A mixed solvent consisting of pure water and an aqueous organic solvent is used for the droplet to be ejected. The aqueous organic solvent contained surfactants, antiseptics, antioxidants, defoaming agents, fungicides, pH adjusting agents, etc., and was adjusted to have affinity with the toner on the photosensitive drum.

In the working example 1, the occurrence of scattering transfer and the like were confirmed in case that no control was applied to the droplet ejection at the temperature of 10-30° C. (10° C. interval) and the relative humidity of 10-80% (10° C. interval) (see FIG. 10), and a threshold value was determined based on the values of the saturated aqueous vapor amount table (see FIG. 9) at various temperatures for purposes of utilizing for controlling the droplet ejection.

More specifically, comparing the result of FIG. 10 with the table of saturated aqueous vapor amount of FIG. 9, it was learned that scattering transfer and the like did not exist in the area where the absolute humidity exceeded 10 at all temperatures. Therefore, the threshold value of the absolute humidity to be used for controlling the droplet ejection was set to 10 in the working example 1.

FIG. 11 is a table showing an experimental result indicating the relation between the occurrence of scattering transfer and the like, temperature, and relative humidity in case of a droplet ejection control without using a threshold value, and FIG. 12 is a table showing an experimental result indicating the relation between the occurrence of scattering transfer and the like, temperature, and relative humidity in the working example 1. As the symbols used therein are the same as in FIG. 10, their descriptions are omitted.

When the droplets were ejected under each condition as shown in FIG. 11, scattering transfer and the like under low temperature and low humidity conditions were improved in comparison with the results of FIG. 10. However, when the droplets were ejected excessively under high temperature and high humidity conditions, image distortions occurred.

Therefore, in the working example 1, the threshold value to be used for the droplet ejection control was determined from the table shown in FIG. 9 based on the image forming conditions (temperature and humidity conditions in the vicinity of the intermediate transfer belt), and the droplet ejection was controlled using the particular threshold value.

More specifically, it was designed in such a way as not to eject the droplets if the absolute humidity exceeds 10 (threshold value), it was possible to obtain a better image quality under each condition as shown in FIG. 12 as image distortions were less likely to occur in high temperature and high humidity environments in comparison with the results of FIG. 11.

Since the ejection amount is adjusted based on the image forming conditions such as the temperature and humidity conditions in the vicinity of the intermediate transfer belt as the transfer member according to the working example 1, image distortions can be prevented, thus making it possible to achieve a high image quality, even when the environmental condition changes to a poor environmental condition, e.g., low temperature and low humidity environment, or high temperature and high humidity environment.

Next, let us describe the working example 2.

FIG. 13 is a table showing the result of an experiment indicating the relation between the occurrence of scattering transfer and the like, the volume of droplet (ejection amount), and the number of toner image colors (number of overlapping colors of toner images) in the working example 2 of the second embodiment. The symbols used in the figure are defined similar to those in FIGS. 10-13. The symbols "C" and "D" when used in relation to image distortions are the same as "C (image)" and "D (image)." The occurrence of scattering transfer is shown on the left and the result of the image distortion on the right of the item respectively.

In the working example 2, 0.2 pl of volume of droplet (ejection amount) was used as the standard value for monochromatic images in order to evaluate the occurrences of scattering transfers and image distortions when the droplets were ejected relative to one through four color images. As the volumes of droplets, 0%, 20%, 40%, 60%, 80%, and 100% of the standard value (0.2 pl) were used. Other conditions were chosen to be identical to those of the working example 1, so that their descriptions are omitted here.

As shown in FIG. 13, the problem of scattering transfers and image distortions gets improved as the droplet volume approaches 100% of the standard value (0.2 pl) in case of monochrome images. In case of two color images, however, since the image distortion does not satisfy the standard when it is 100% of the standard value (0.2 pl), it is seen that it is better to eject the droplets at 80% of the standard value (0.16 pl). In case of three color images, however, since the image distortion does not satisfy the standard neither when it is 80% of the standard value (0.16 pl) nor 100% of the standard value (0.2 pl), it is seen that it is better to eject the droplets at 60% of the standard value (0.12 pl). In case of four color images, however, since the image distortion does not satisfy the standard neither when it is 600 of the standard value (0.12 pl) nor 80% of the standard value (0.16 pl) nor 100% of the standard value (0.2 pl), it is seen that it is better to eject the droplets at 40% of the standard value (0.08 pl).

According to the working example 2, it is possible to prevent scattering transfers and image distortions by varying (adjusting) the volume of droplet ejected (ejection amount) in accordance with the number of colors of the toner image, which is one of the image forming conditions.

As can be seen from the above, the image forming apparatus according to the second embodiment of the invention enables us to execute high quality printing actions under various image forming conditions, in other words, to obtain high quality images by means of controlling the droplet ejection based on the image forming conditions (ambient temperature and humidity conditions, toner image colors and the number of toner image colors) after forming the toner image on the image carrying member and before transferring the toner image to the transfer member and consequently suppressing in a stable manner scattering transfers that tend to occur in a low temperature and low humidity environment and image distortions that tend to occur in a high temperature and high humidity environment. It is also possible to reduce excessive water to be supplied.

The droplet ejecting unit 60A controls the droplet ejection per each color of toner image in forming the toner image consisting of multiple colors of Y, M, C, and Y. Therefore, it was made possible to prevent scattering transfers and image distortions from occurring in the formation of each toner image in one color, thus preventing scattering transfers and image distortions from occurring in full color printing images that are formed as a result.

The droplet ejecting unit 60A is constituted in order to vary ejection amount in accordance with the number of colors used in a toner image (to reduce ejection amount as the number of colors used in a toner image increases). Consequently, it is possible to prevent scattering transfers and image distortions that may occur when the droplet ejection is controlled based on the ejection amount for the monochromatic toner image in case of a multiple color toner image.

It is obvious that this invention is not limited to the particular embodiments shown and described above but may be variously changed and modified without departing from the technical concept of this invention. For example, although the droplet ejecting unit 60A according to the second embodiment is intended for ejecting the droplets onto the photosensitive drum 1 during the image transfer (primary transfer) from the photosensitive drum 1 to the intermediate transfer belt 6, it can also be applied for ejecting the droplets onto the intermediate transfer belt 6 during the image transfer (secondary transfer) from the intermediate transfer belt 6 to a sheet of paper. Furthermore, in case of a direct transfer wherein no intermediate transfer does occur, the droplets can be ejected onto the photosensitive drum during the image transfer from the photosensitive drum to a sheet of paper. Since scattering transfer and the like occur on a sheet of paper, they can be directly prevented by ejecting droplets during the transfer of images to the sheet of paper.

What is claimed is:

1. An image forming apparatus comprising:
an image carrying member on which an electrostatic latent image is formed;
a developing part for forming a toner image by causing a developing agent to adhere to said electrostatic latent image;
a transfer part for transferring said toner image onto a transfer member;
a droplet ejecting unit for ejecting droplets onto said toner image on said image carrying member after forming said toner image on said image carrying member and before transferring said toner image to said transfer member; and
a controller for controlling an ejection area of said droplet ejecting unit in accordance with image information of said toner image;
wherein said droplets ejected by said droplet ejecting unit are micro droplets having a volume range of 0.06-0.2 pl.

2. The image forming apparatus claimed in claim 1, wherein said controller controls said droplet ejecting unit in such a manner that said droplets are ejected on an outline of said toner image formed and its vicinity in terms of pixel unit based on said image information of said toner image.

3. The image forming apparatus claimed in claim 1, wherein said droplets ejected by said droplet ejecting unit consists of pure water, or a mixed solvent produced by mixing pure water with an aqueous organic solvent.

4. An image forming apparatus comprising:
an image carrying member on which an electrostatic latent image is formed;
a developing part for forming a toner image by causing a developing agent to adhere to said electrostatic latent image;
a transfer part for transferring said toner image onto a transfer member;
a droplet ejecting unit for ejecting droplets onto said toner image on said image carrying member after forming said toner image on said image carrying member and before transferring said toner image to said transfer member;
a controller for controlling an ejection area of said droplet ejecting unit in accordance with image information of said toner image; and
a plurality of said image developing parts and said transfer parts corresponding with a plurality of colors wherein said droplet ejecting unit consists of a plurality of droplet ejecting units that eject droplets to said toner images of various colors, respectively;
wherein said controller controls said plurality of droplet ejecting unit in such a way as to cause the droplet ejection amount to vary according the colors that overlay on each other on said image carrying member;
wherein said controller controls the droplet ejection amount to reduce as number of overlaid colors increases.

5. The image forming apparatus claimed in claim 1, wherein said controller controls the droplet ejection onto said toner image based on information of the image to be formed as to whether it is a photographic image or a character image.

6. The image forming apparatus claimed in claim 1, wherein said controller controls the droplet ejection onto said toner image based on number of colors to be used for the image formation.

7. The image forming apparatus claimed in claim 1, wherein said control unit controls the droplet ejection onto said toner image based on temperature and humidity during the image formation.

8. The image forming apparatus claimed in claim 1, wherein said control unit controls the droplet ejection onto said toner image on said image carrier member based on an image forming condition during the image formation.

* * * * *